(12) United States Patent
Park

(10) Patent No.: US 10,700,371 B2
(45) Date of Patent: Jun. 30, 2020

(54) METHOD AND SYSTEM FOR CONTROLLING OUTPUT CURRENT OF FUEL CELL STACK

(71) Applicants: HYUNDAI MOTOR COMPANY, Seoul (KR); KIA MOTORS CORPORATION, Seoul (KR)

(72) Inventor: Jeong Kyu Park, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 198 days.

(21) Appl. No.: 15/654,166

(22) Filed: Jul. 19, 2017

(65) Prior Publication Data

US 2018/0114996 A1   Apr. 26, 2018

(30) Foreign Application Priority Data

Oct. 26, 2016   (KR) .................. 10-2016-0140385

(51) Int. Cl.
| | |
|---|---|
| *H01M 8/04858* | (2016.01) |
| *H01M 8/04537* | (2016.01) |
| *B60L 58/32* | (2019.01) |
| *B60L 58/33* | (2019.01) |

(Continued)

(52) U.S. Cl.
CPC ........... *H01M 8/0491* (2013.01); *B60L 50/72* (2019.02); *B60L 58/32* (2019.02); *B60L 58/33* (2019.02); *H01M 8/04358* (2013.01); *H01M 8/04559* (2013.01); *H01M 2250/20* (2013.01); *Y02T 90/32* (2013.01); *Y02T 90/34* (2013.01)

(58) Field of Classification Search
CPC ........... H01M 8/0491; H01M 8/04358; H01M 8/04559
See application file for complete search history.

(56) References Cited

U.S. PATENT DOCUMENTS

| | | | |
|---|---|---|---|
| 7,892,688 B2 | 2/2011 | Takaku et al. | |
| 8,182,953 B2 | 5/2012 | Manabe | |

FOREIGN PATENT DOCUMENTS

| | | | | |
|---|---|---|---|---|
| JP | 2004178998 A | * | 6/2004 | ........ H01M 8/04559 |
| JP | 2008-251404 A | | 10/2008 | |
| JP | 2008-300299 A | | 12/2008 | |

(Continued)

OTHER PUBLICATIONS

Hasuka et al. JP 2004-178998A. Jun. 24, 2004. English translation. (Year: 2004).*

(Continued)

*Primary Examiner* — James Lee
(74) *Attorney, Agent, or Firm* — Morgan, Lewis & Bockius LLP

(57) ABSTRACT

Disclosed are a method and a system for controlling an output current of a fuel cell stack. The method of controlling the output current of the fuel cell stack, whereby the output current is controlled by using a data map configured with a limited output current according to a temperature of a fuel cell coolant, includes: deriving an average cell voltage value and a minimum cell voltage value of a plurality of cells constituting the fuel cell stack; correcting the data map by using the derived average cell voltage value and the derived minimum cell voltage value; and limiting the output current of the fuel cell according to the corrected data map.

10 Claims, 3 Drawing Sheets

(51) Int. Cl.
B60L 50/72 (2019.01)
H01M 8/0432 (2016.01)

(56) References Cited

FOREIGN PATENT DOCUMENTS

| | | |
|---|---|---|
| JP | 2015-82850 A | 4/2015 |
| KR | 10-2011-0036448 A | 4/2011 |
| KR | 10-1349021 B1 | 1/2014 |
| KR | 10-2016-0073289 A | 6/2016 |

OTHER PUBLICATIONS

Korean Office Action dated Dec. 14, 2017 issued in Korean Patent Application No. 10-2016-0140385.

* cited by examiner

METHOD AND SYSTEM FOR CONTROLLING OUTPUT CURRENT OF FUEL CELL STACK

CROSS REFERENCE TO RELATED APPLICATION

The present application claims the benefit of priority to Korean Patent Application No. 10-2016-0140385, filed on Oct. 26, 2016, in the Korean Intellectual Property Office, the entire contents of which is incorporated herein for all purposes by this reference.

TECHNICAL FIELD

The present disclosure generally relates to a method and a system for controlling an output current of a fuel cell stack in which performance stability of the fuel cell stack is ensured and deterioration thereof is prevented by limiting the output current of the fuel cell stack according to a temperature of the fuel cell stack when a large amount of the output current is required at a low temperature and varying the output current according to a condition of the fuel cell stack.

BACKGROUND

Fuel cell stacks may provide maximum performance at a specific temperature or higher, but at a low temperature, activation of the fuel cell stack is degraded and the performance thereof cannot be demonstrated. Hence, in most fuel cell vehicles, a reference temperature of a fuel cell coolant is defined such that an output current is limited below the reference temperature and a restriction thereof is imposed such that the fuel cell stack does not consume much electricity in that temperature. However, as the fuel cell stack begins to deteriorate, a fuel cell stack voltage is lowered even though the same current is consumed at the same temperature. When the fuel cell vehicle is fully accelerated, a problem may occur in vehicle running performance. In order to prevent the problem, a monitoring and controlling algorithm that monitors a fuel cell stack status and varies a data map of the output current at low temperatures is required.

The foregoing is intended merely to aid in the understanding of the background of the present disclosure, and is not intended to mean that the present disclosure falls within the purview of the related art that is already known to those skilled in the art.

SUMMARY

An aspect of the present disclosure has been made keeping in mind the above problems occurring in the related art, and the present disclosure is intended to propose a method and system for controlling an output current of a fuel cell stack in which performance stability of the fuel cell stack is ensured and deterioration thereof is prevented by limiting the output current of the fuel cell stack according to a temperature of the fuel cell stack when a large amount of the output current is required at a low temperature and varying the output current according to a condition of the fuel cell stack.

In order to achieve the above object, according to one aspect of the present disclosure, there is provided a method of controlling an output of a fuel cell stack whereby an output current is controlled by using a data map configured with a limited output current according to a temperature of a fuel cell coolant, the method including: deriving an average cell voltage value and a minimum cell voltage value of a plurality of cells constituting the fuel cell stack; correcting the data map by using the derived average cell voltage value and the derived minimum cell voltage value; and limiting the output current of the fuel cell stack according to the corrected data map.

According to the method of controlling the output of the fuel cell stack, when the data map is corrected, the method may further include: updating the corrected data map in a memory, and limiting the output current of the fuel cell stack by using the updated data map when starting of the fuel cell stack is performed afterwards.

According to the method of controlling the output of the fuel cell stack, the method may further include: calculating a cell voltage ratio by dividing the minimum cell voltage value by the average cell voltage value; and calculating a cell voltage deviation by subtracting the minimum cell voltage value from the average cell voltage value.

In the correcting of the data map, the data map may be corrected by using the derived minimum cell voltage value, the derived cell voltage ratio, and the derived cell voltage deviation.

The data map may be a graph whereby an X-axis is for the temperature of the fuel cell coolant and a y-axis is for the limited output current, and the limited output current may tend to increase as the temperature of the fuel cell coolant increases in the graph, but the limited output current may be bounded by a maximum value and a minimum value, and a slope of a line in the graph may gradually increases as the temperature of the fuel cell coolant increases within a range from the minimum value to the maximum value.

The graph may include: an inflection point referring to a point C at which the limited output current starts to increase from the minimum value, an inflection point referring to a point A at which the slope of the line in the graph is changed to increase within the range from the minimum value to the maximum value, and an inflection point referring to a point B at which the limited output current is saturated to the maximum value.

In the correcting of the data map, positions of the point A, the point B, or the point C within the graph may be changed using the cell voltage ratio obtained by dividing the minimum cell voltage value by the average cell voltage value, a cell voltage deviation obtained by subtracting the minimum cell voltage value from the average cell voltage value, and the minimum cell voltage value.

In the correcting of the data map, the graph may be corrected by deriving a correction factor K and x and y coordinates of the points A, B, and C by using the following formula.

$$K = \frac{\text{cell voltage ratio}}{\text{minimum cell voltage value} * \text{cell voltage deviation}}, 10 \le K \le 200$$

$$Cx = \frac{\text{number of cells}}{100}$$

$$Cy = \text{number of cells} * 0.3$$

$$Ax = \left( \frac{\frac{\text{number of cells}}{10} * Cx}{K} \right) - Cx + \frac{\text{number of cells}}{10}$$

$$Ay = (By - Cy) * \frac{K - 10}{190} + Cy$$

$$Bx = \frac{\text{number of cells}}{K} + \frac{\text{number of cells}}{10}$$

$$By = \text{number of cells} * 0.75$$

In the correcting of the data map, the graph may be corrected by deriving the x and y coordinates of the points A, B, and C when the derived correction factor K becomes smaller than a previous correction factor K.

The correcting of the data map may be performed when a demanded output of the fuel cell stack is equal to or greater than a certain level, a cell voltage ratio obtained by dividing the minimum cell voltage value by the average cell voltage value is equal to or less than a first reference value, and a cell voltage deviation obtained by subtracting the minimum cell voltage value from the average cell voltage value is equal to or greater than a second reference value.

According to another aspect of the present disclosure, there is provided a method of controlling an output of a fuel cell stack whereby an output current is controlled by using a data map configured with a limited output current according to a temperature of a fuel cell coolant, the method including: deriving, by a controller, an average cell voltage value and a minimum cell voltage value of a plurality of cells constituting the fuel cell stack by using a sensor provided in the fuel cell stack; correcting, by the controller, the data map stored in a memory by using the derived average cell voltage value and the derived minimum cell voltage value; and limiting, by the controller, the output current of the fuel cell stack according to the corrected data map stored in the memory.

To this end, a system for controlling an output of a fuel cell stack, includes: a sensor sensing voltages of a plurality of fuel cells; a memory storing a data map configured with a limited output current according to a temperature of a fuel cell coolant; and a controller deriving an average cell voltage value and a minimum cell voltage value of the plurality of cells constituting the fuel cell stack, correcting the data map by using the derived average cell voltage value and the derived minimum cell voltage value; and limiting the output current of the fuel cell stack according to the corrected data map.

According to the method and system for controlling the output current of the fuel cell stack of the present disclosure, performance stability of the fuel cell is ensured and deterioration thereof may be prevented by limiting the output current of the fuel cell stack according to the temperature of a fuel cell coolant when a large amount of output current is required at a low temperature and varying the output current according to a condition of the fuel cell stack.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
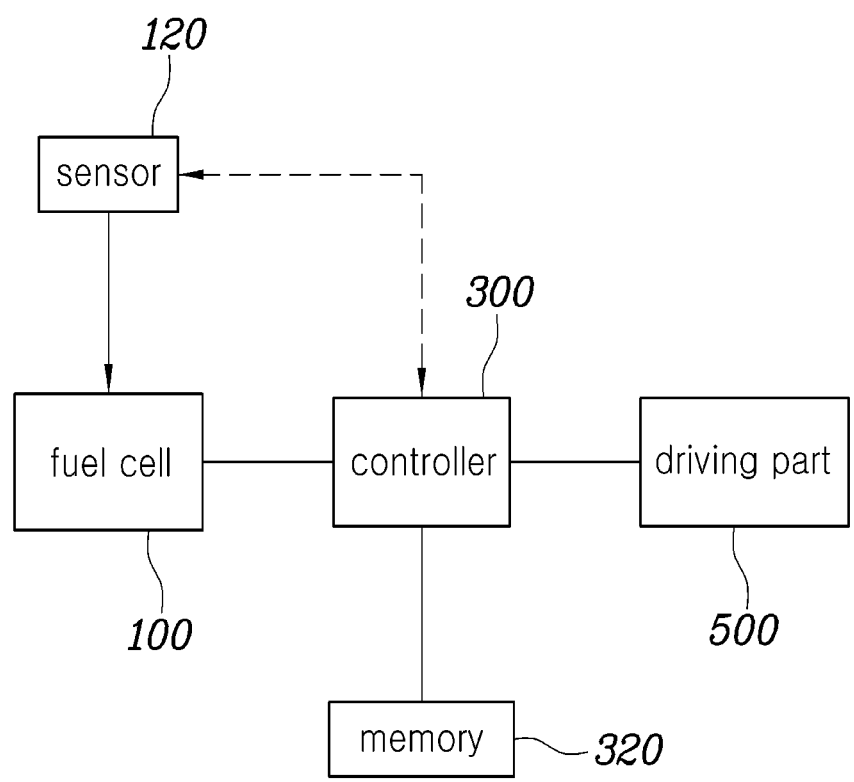
FIG. 1 is a configuration diagram of a system for controlling an output current of a fuel cell stack according to an exemplary embodiment of the present disclosure.

Hereinbelow, exemplary embodiments of the present disclosure will be described in detail with reference to the accompanying drawings. Throughout the drawings, the same reference numerals will refer to the same or like parts.

Figure 2:
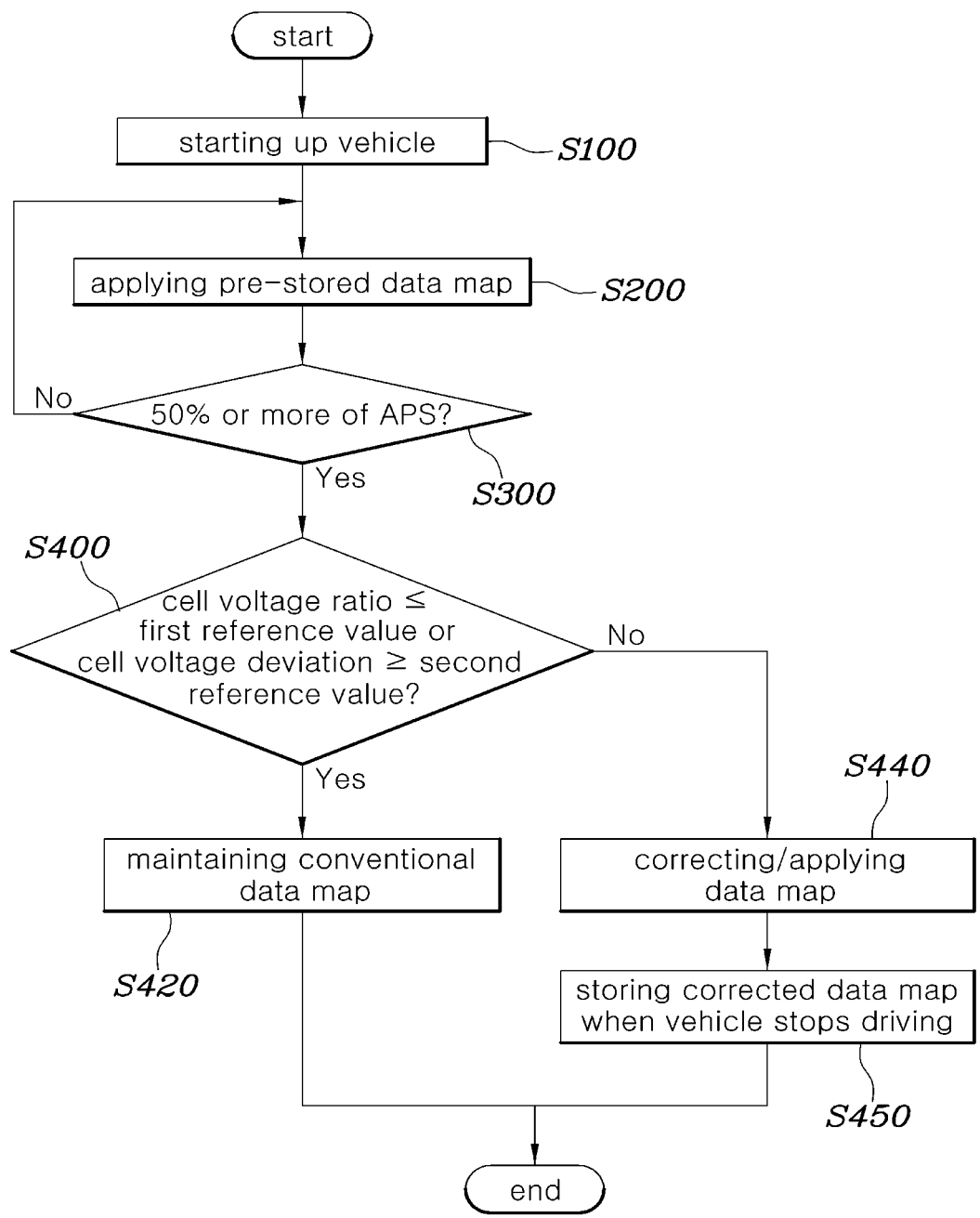
FIG. 2 is a flow chart showing a method of controlling an output current of a fuel cell stack according to an exemplary embodiment of the present disclosure.
Figure 3:
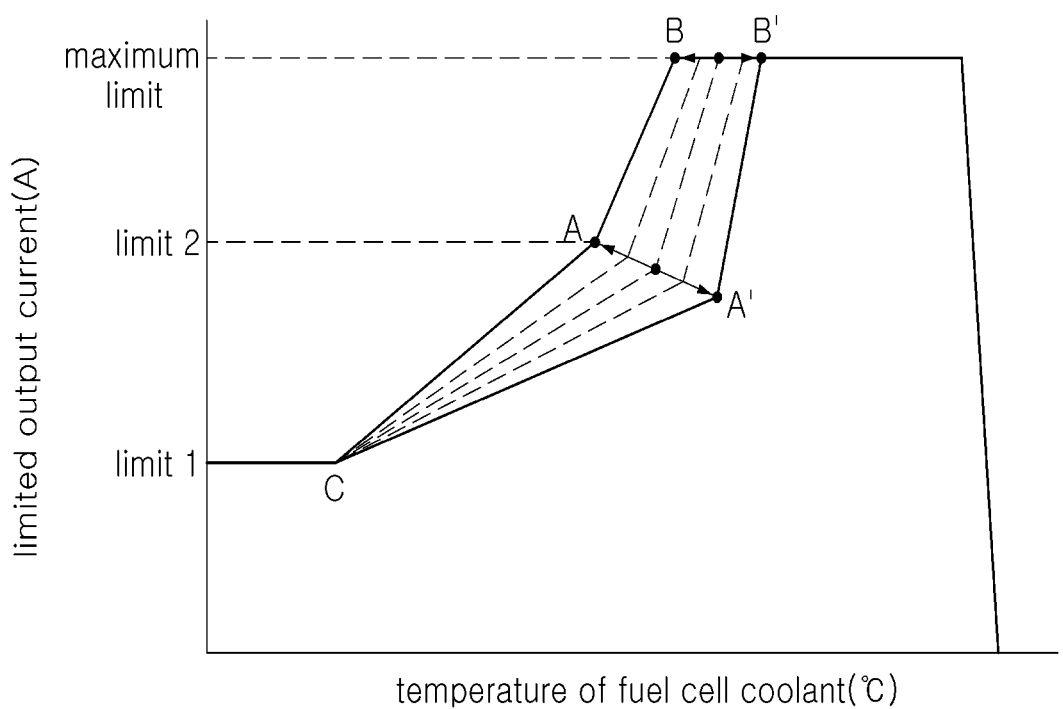
FIG. 3 is a view showing a graph of a data map of the method of controlling the output current of the fuel cell stack according to an exemplary embodiment of the present disclosure.

FIG. 1 is a configuration diagram of a system for controlling an output current of a fuel cell stack according to an exemplary embodiment of the present disclosure, FIG. 2 is a flow chart showing a method of controlling an output current of a fuel cell stack according to an exemplary embodiment of the present disclosure, and FIG. 3 is a view showing a graph of a data map of the method of controlling the output current of the fuel cell stack according to an exemplary embodiment of the present disclosure.

Referring to FIGS. 1 and 2, the method of controlling the output current of the fuel cell stack according to the embodiment of the present disclosure, whereby the output current is controlled by using a data map configured with a limited output current according to a temperature of fuel cell coolant, includes: deriving an average cell voltage value and a minimum cell voltage value of a plurality of cells constituting the fuel cell 100 (S400); correcting the data map by using the derived average cell voltage value and the derived minimum cell voltage value (S440); and limiting the output current of the fuel cell according to the corrected data map (S440).

In the method of controlling the output current of the fuel cell stack according to the present disclosure, a limited output data map at low temperature starting is predefined, and a controller 300 controls the output current by referencing the limited output data map. At the time of general starting, the temperature of the fuel cell coolant is usually 30 degrees Celsius or less, and in the winter, the temperature of the fuel cell coolant is below zero degrees Celsius. In the above situation, when a user starts a vehicle, a controller 300 of the vehicle may increase an output current up to a Limit_1 until a temperature of a point C of FIG. 3. Further, when the temperature of the fuel cell coolant gradually increases until a temperature of a point A of FIG. 3, the controller 300 may increase the output current up to a Limit_2. Further, when the temperature of the fuel cell coolant increases until a temperature of a point B of FIG. 3, the controller 300 may increase the output current up to the maximum limit (Maximum_Limit). In addition, the controller 300 linearly increases the output current at temperatures within ranges between the points C, A, and B. When the temperature of the fuel cell coolant continues to rise, the controller 300 limits the output current to prevent the fuel cell stack from being damaged. FIG. 3 is a line of a graph showing the data map of limited output current of the fuel cell stack.

When the controller 300 limits the output current by using a single fixed graph and not changing the line of the graph, and the vehicle accelerates (50% or more of valve opening ratio by accelerator pedal) before the temperature of the fuel cell coolant reaches the point B, a rattling is generated in the vehicle since the performance of the fuel cell stack becomes unstable. In addition, when the fuel cell stack begins to deteriorate, the rattling generated in the vehicle becomes worse. In order to prevent the above case, the controller 300 has to monitor a state of the fuel cell stack at a low temperature and change the data map of the limited output current of the fuel cell stack. In the present disclosure, a range of the limited output current of the data map is set through an actual vehicle test, and the controller 300 monitors and varies the limited output current within the range.

As a result of the test, stability of cell voltage is ensured by increasing temperature values of an X-axis of points A and B and by decreasing the Limit_2 that is a y-axis coordinate of the point A. However, when the Limit_2 is decreased too much, the acceleration performance becomes worse.

Therefore, in the present disclosure, the controller 300 monitors values of the cell voltage deviation DV and the cell voltage ratio RV such that the line of the graph of the limited output at a low temperature follows lines of the points C→A→B. Further, when the RV value is equal to or less than a maximum value or the DV value is equal to or greater than a minimum value, the controller 300 controls the line of the graph to follow lines of points C→A'→B'. When the DV value and the RV value are between the specified minimum and maximum values, the point A is located between A↔A' and the point B is located between B↔B'. The controller 300 corrects the data map of the limited output current at a low temperature according to the DV value and the RV value, and the corrected data map is stored in a memory 320 of the controller 300 when the vehicle stops driving. The data map of the limited output current at a low temperature stored in the memory 320 is used when the vehicle starts to be driven afterwards. Accordingly, various situations may arise according to the state of the fuel cell stack such as outputting a large amount of current even though the temperature of the fuel cell coolant has not reached a specific temperature or outputting a large amount of current when the temperature of the fuel cell coolant increases too much. Thus, the controller 300 limits the output current to ensure both the operability and the durability of the fuel cell stack.

Referring to FIG. 1, a system for controlling an output current of a fuel cell stack according to an exemplary embodiment of the present disclosure includes: a sensor 120 sensing voltages of a plurality of cells constituting the fuel cell 100 stack; a memory 320 storing a data map configured with a limited output current according to a temperature of a fuel cell coolant; and a controller 300 deriving an average cell voltage value and a minimum cell voltage value of the plurality of cells constituting the fuel cell 100 stack, correcting the data map by using the derived average cell voltage value and the derived minimum cell voltage value; limiting the output current of the fuel cell stack according to the corrected data map; and controlling the output current of a driving part 500 according to the corrected data map.

In addition, the method of controlling the output current of the fuel cell stack of the above system, whereby the output current is controlled by using the data map configured with the limited output current according to the temperature of the fuel cell coolant, includes: deriving an average cell voltage value and a minimum cell voltage value of the plurality of cells constituting the fuel cell; correcting the data map by using the derived average cell voltage value and the derived minimum cell voltage value; and limiting the output current of the fuel cell stack according to the corrected data map.

Referring to FIG. 2, a fuel cell vehicle starts up (S100). Herein, the controller 300 controls the output current at a low temperature start by using a pre-stored data map (S200). The controller 300 derives the average cell voltage value and the minimum cell voltage value of the plurality of cells constituting the fuel cell 100 stack by using a sensor 120.

Next, the controller 300 determines whether or not to correct a line of a graph of the data map by using the derived the average cell voltage value and the derived minimum cell voltage value (S300 and S400). When the controller 300 determines not to correct the data map, the data map is maintained (S420). Alternatively, when the controller 300 determines to correct the data map, the controller 300 corrects the line of the graph of the data map by using the derived the average cell voltage value and the derived minimum cell voltage value, limits the output current of the fuel cell stack according to the corrected data map, and updates the data map in the memory 320 of the controller 300 when the vehicle stops driving (S440 and S450). When the data map is corrected, the corrected data map is updated in the memory 320. When the fuel cell vehicle starts afterwards, the controller 300 limits the output current of the fuel cell stack by using the updated data map.

The method of controlling the output current of the fuel cell stack according to the present disclosure calculates a cell voltage ratio by dividing the minimum cell voltage value by the average cell voltage value, and calculates a cell voltage deviation by subtracting the minimum cell voltage value from the average cell voltage value. Since the cell voltage ratio is obtained by dividing the minimum cell voltage value by the average cell voltage value, thus as the cell voltage ratio becomes smaller, the minimum cell voltage becomes lower which means that the fuel cell stack becomes unstable. Therefore, the larger the cell voltage ratio is, the more stable the fuel cell becomes. Meanwhile, since the cell voltage deviation is obtained by subtracting the minimum cell voltage value from the average cell voltage value, the smaller the cell voltage deviation is, the more stable the fuel cell becomes.

Further, in the correcting of the data map, the data map may be corrected by using the derived minimum cell voltage value, the derived cell voltage ratio, and the derived cell voltage deviation. As shown in FIG. 3, the data map is a graph whereby an X-axis is for the fuel cell temperature and a y-axis is for the limited output current, and the limited output current tends to increase as the temperature of the fuel cell coolant increases in the graph, but the limited output current is bounded by a maximum value and a minimum value and a slope of a line in the graph gradually increases as the fuel cell temperature increases within a range from the minimum value to the maximum value.

In detail, as shown in FIG. 3, the graph includes an inflection point referred to a point C at which the limited output current starts to increase from the minimum value, an inflection point referred to a point A at which the slope of the line within the range from the minimum value to the maximum value in the graph is changed to increase, and an inflection point referred to a point B at which the limited output current is saturated to the maximum value.

In the correcting of the data map, a position of the point A, the point B, or the point C within the graph is changed using the cell voltage ratio obtained by dividing the minimum cell voltage value by the average cell voltage value, the cell voltage deviation obtained by subtracting the minimum cell voltage value from the average cell voltage value, and the minimum cell voltage value.

In detail, in the correcting of the data map, the graph is corrected by deriving a correction factor K and x and y coordinates of the points A, B, and C by being derived using the following formula.

$$K = \frac{\text{cell voltage ratio}}{\text{minimum cell voltage value} * \text{cell voltage deviation}}, 10 \le K \le 200$$

$$Cx = \frac{\text{number of cells}}{100}$$

$$Cy = \text{number of cells} * 0.3$$

$$Ax = \left(\frac{\frac{\text{number of cells}}{10} * Cx}{K}\right) - Cx + \frac{\text{number of cells}}{10}$$

$$Ay = (By - Cy) * \frac{K - 10}{190} + Cy$$

$$Bx = \frac{\text{number of cells}}{K} + \frac{\text{number of cells}}{10}$$

$$By = \text{number of cells} * 0.75$$

As shown in the above formula, the correction factor K may be determined within a range from 10 to 200 and may be changed according to a number of cells of the fuel cell stack or other specifications. Since the correction factor K is calculated by using the minimum cell voltage value, the cell voltage ratio, and the cell voltage deviation, the correction factor K variously reflects the overall stability of the fuel cell stack. Since the larger the cell voltage ratio is, the more stable the fuel cell becomes, and the smaller the cell voltage deviation or the minimum cell voltage is, the more stable the fuel cell becomes. Thus, the larger the correction factor K is, the more stable the fuel cell is.

The point C is a fixed value that is determined by the number of cells constituting the fuel cell stack. The line in the graph of FIG. 3 is changed according to coordinate changes of the points A and B. In case of the points A and B, values of Ax and Bx become larger when the correction factor K becomes smaller. The fuel cell stack becomes unstable when the correction factor K becomes smaller, thus the output current is strictly limited. In addition, an Ay value becomes smaller when the correction factor K becomes smaller, thus a limit of the output current decreases as much as the stability of the fuel cell stack decreases. Therefore, according to the above formula, when the stability of the fuel cell decreases, the output current of the fuel cell stack is conservatively limited.

In the correcting of the data map, the graph is corrected by deriving the x and y coordinates of the points A, B, and C when the derived correction factor K becomes smaller than a previous factor K. In other words, when the correction factor K increases, the fuel cell becomes more stable, but when the factor K decreases, the fuel cell becomes unstable. Thus, in the above case, the x and y coordinates of the points A, B, and C within the graph may be corrected.

Alternatively, in the correcting of the data map as shown in FIG. 2, since the stability of the fuel cell stack may be impaired, when a demanded output of the fuel cell is equal to or greater than a certain level (for example, 50% or more of valve opening ratio by accelerator pedal), a cell voltage ratio obtained by dividing the minimum cell voltage value by the average cell voltage value is equal to or less than a first reference value, and a cell voltage deviation obtained by subtracting the minimum cell voltage value from the average cell voltage value is equal to or greater than a second reference value, then in the above case, the graph of the data map may be corrected. In addition, in low temperature environments below a specific temperature, the graph may also be corrected.

The data map is stored in a non-volatile memory 320, and the graph of the data map is updated when the graph is corrected. The updated data map that is stored during a previous driving is used when starting of the fuel cell stack is performed afterwards. A voltage sensor 120 is used for respectively sensing the plurality of cells of the fuel cell stack. Alternatively, the voltages of the cells may be obtained by calculating values sensed by current sensors or other sensors.

The point A or the point A' in FIG. 3 may be a median value of the limited output current based on the temperature of the fuel cell coolant before the vehicle is warmed up. The point B or the point B' may be the maximum value of the limited output current based on the temperature of the fuel cell coolant after the vehicle is warmed up.

Since there is a high possibility that problems will occur in the stability of the fuel cell stack when the controller 300 rapidly increases the output current, the point A (A') is set such that the controller 300 gradually increases the output current when the temperature of the fuel cell coolant is low. When the line in the graph passes the point A (A'), which means that the temperature of the fuel cell coolant has reached a specific temperature, and after the point A, since the fuel cell stack becomes stable, the controller 300 is able to rapidly increase the output current of the fuel cell stack by a large amount by releasing the limited current output by increasing the slope of the line in the graph.

However, when the fuel cell stack begins to deteriorate, the fuel cell stack reacts more sensitively to temperature. Thus, there is a problem in the fuel cell stack stability before the temperature of the fuel cell coolant reaches the optimum temperature. Therefore, since the fuel cell stack stability is important when driving the vehicle, the controller 300 increases the output current of the fuel cell stack as slowly as possible when the temperature of the fuel cell coolant is low (before the vehicle is warmed up) and releases the limited output current when the temperature of the fuel cell coolant reaches the optimum temperature.

The minimum cell voltage value, the cell voltage deviation, and the cell voltage ratio are control logic parameters that are important while driving the vehicle, and a torque of a vehicle motor is adjusted by the above parameters. The torque of the motor may be suddenly changed when the above parameters are suddenly changed, thus rattling is generated in the vehicle and drivability becomes worse.

According to the method and system for controlling the output current of the fuel cell stack of the present disclosure, performance stability of the fuel cell stack is ensured and deterioration thereof may be prevented by limiting the output current of the fuel cell stack according to the temperature of the fuel cell coolant when a large amount of output current is required at a low temperature, and by varying the output current according to a condition of the fuel cell stack.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of controlling an output of a fuel cell stack whereby an output current is controlled by using a data map stored in a memory and configured with a limited output current corresponding to a temperature of a fuel cell coolant, the method comprising:

sensing, by a sensor, voltages of a plurality of cells constituting the fuel cell stack;

deriving, by a controller, an average cell voltage value and a minimum cell voltage value of the plurality of cells based on the sensed voltages;

determining, by the controller, whether to correct the data map based on the derived average cell voltage value and the derived minimum cell voltage value;

when the data map is determined to be corrected, correcting, by the controller, the data map by varying the limited output current corresponding to the temperature of the fuel cell coolant according to the derived average cell voltage value and the derived minimum cell voltage value; and controlling, by the controller, the output current of the fuel cell stack to be limited to the varied limited output current according to the corrected data map.

2. The method of claim 1, further comprising:

when the data map has been corrected, storing, by the controller, the corrected data map in the memory, and limiting the output current of the fuel cell stack by using the stored data map when starting of the fuel cell stack is performed afterwards.

3. The method of claim 1, further comprising:

calculating a cell voltage ratio by dividing the minimum cell voltage value by the average cell voltage value; and calculating a cell voltage deviation by subtracting the minimum cell voltage value from the average cell voltage value.

4. The method of claim 3, wherein in the correcting of the data map, the data map is corrected by using the minimum cell voltage value, the cell voltage ratio, and the cell voltage deviation.

5. The method of claim 1, wherein the data map is a graph whereby an X-axis is for the temperature of the fuel cell coolant and a y-axis is for the limited output current, and the limited output current tends to increase as the temperature of the fuel cell coolant increases in the graph, but the limited output current is bounded by a maximum value and a minimum value, and a slope of a line in the graph gradually increases as the temperature of the fuel cell coolant increases within a range from the minimum value to the maximum value.

6. The method of claim 5, wherein the graph includes: an inflection point referred to a point C at which the limited output current starts to increase from the minimum value, an inflection point referred to a point A at which the slope of the line in the graph is changed to increase within the range from the minimum value to the maximum value, and an inflection point referred to a point B at which the limited output current is saturated to the maximum value.

7. The method of claim 6, wherein in the correcting of the data map, positions of the point A, the point B, or the point C within the graph are changed using the cell voltage ratio obtained by dividing the minimum cell voltage value by the average cell voltage value, a cell voltage deviation obtained by subtracting the minimum cell voltage value from the average cell voltage value, and the minimum cell voltage value.

8. The method of claim 7, wherein in the correcting of the data map, the graph is corrected by deriving a correction factor K and coordinates of the points A, B, and C by using a following formula:

$$K = \frac{\text{cell voltage ratio}}{\text{minimum cell voltage value} * \text{cell voltage deviation}}, 10 \leq K \leq 200$$

$$Cx = \frac{\text{number of cells}}{100}$$

$$Cy = \text{number of cells} * 0.3$$

$$Ax = \left(\frac{\frac{\text{number of cells}}{10} * Cx}{K}\right) - Cx + \frac{\text{number of cells}}{10}$$

$$Ay = (By - Cy) * \frac{K - 10}{190} + Cy$$

$$Bx = \frac{\text{number of cells}}{K} + \frac{\text{number of cells}}{10}$$

$$By = \text{number of cells} * 0.75$$

wherein the coordinates of the points A, B, and C are determined by Ax and Ay, Bx and By, and Cx and Cy, respectively, Ax, Bx and Cx are coordinates in the X-axis, and Ay, By and Cy are coordinates in the Y-axis.

9. The method of claim 8, wherein in the correcting of the data map, the graph is corrected by deriving the x and y coordinates of the points A, B, and C when the derived correction factor K becomes smaller than a previous correction factor.

10. The method of claim 1, wherein the correcting of the data map is performed when a demanded output of the fuel cell stack is equal to or greater than a certain level, a cell voltage ratio obtained by dividing the minimum cell voltage value by the average cell voltage value is equal to or less than a first reference value, and a cell voltage deviation obtained by subtracting the minimum cell voltage value from the average cell voltage value is equal to or greater than a second reference value.

* * * * *